T. SCHERF.
MACHINE FOR MAKING REINFORCED PAPER.
APPLICATION FILED SEPT. 9, 1915.
1,192,568.
Patented July 25, 1916.
9 SHEETS—SHEET 2.
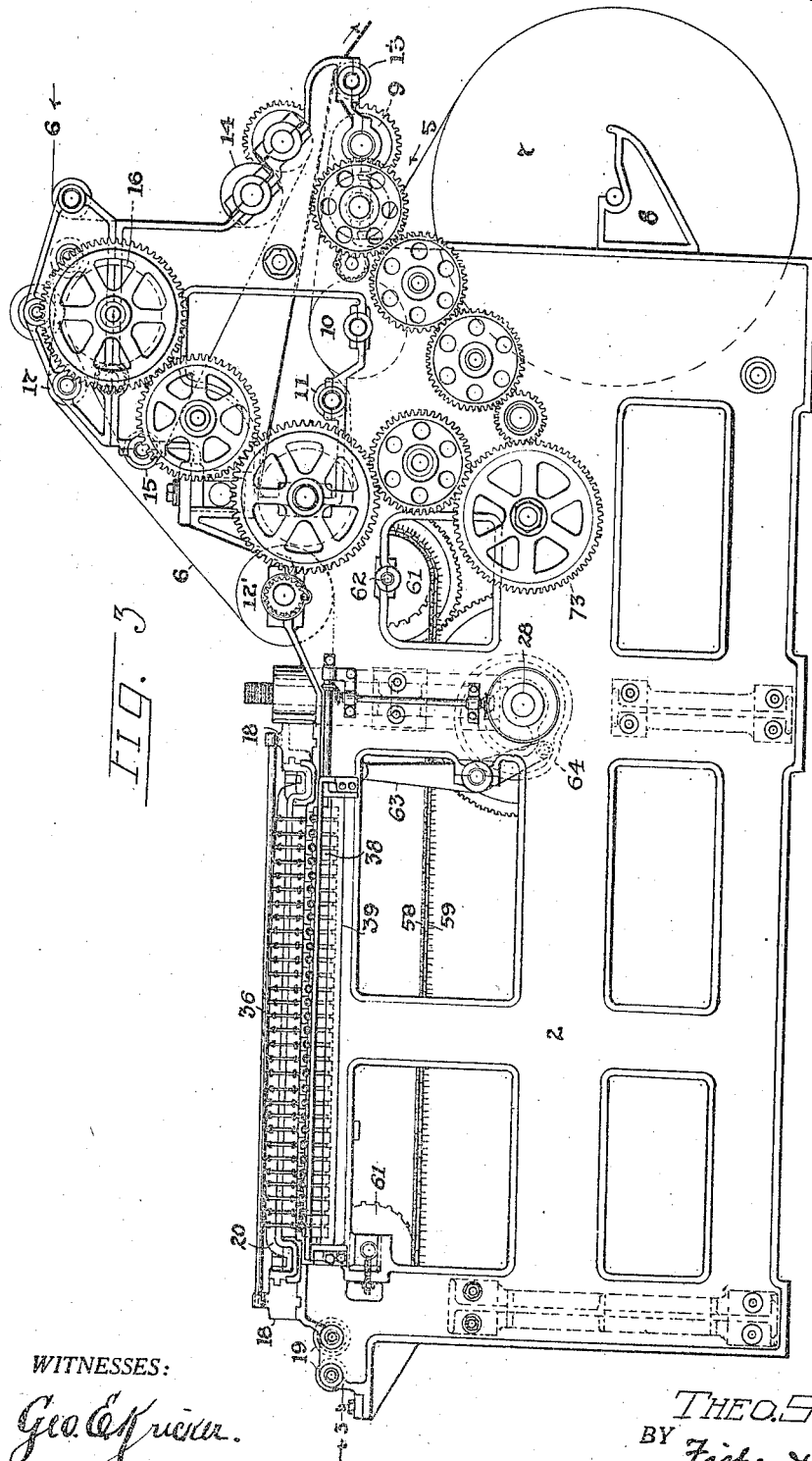
WITNESSES:
Geo. E. Kruger
INVENTOR.
THEO. SCHERF.
BY Fisher & ...
ATTORNEYS.

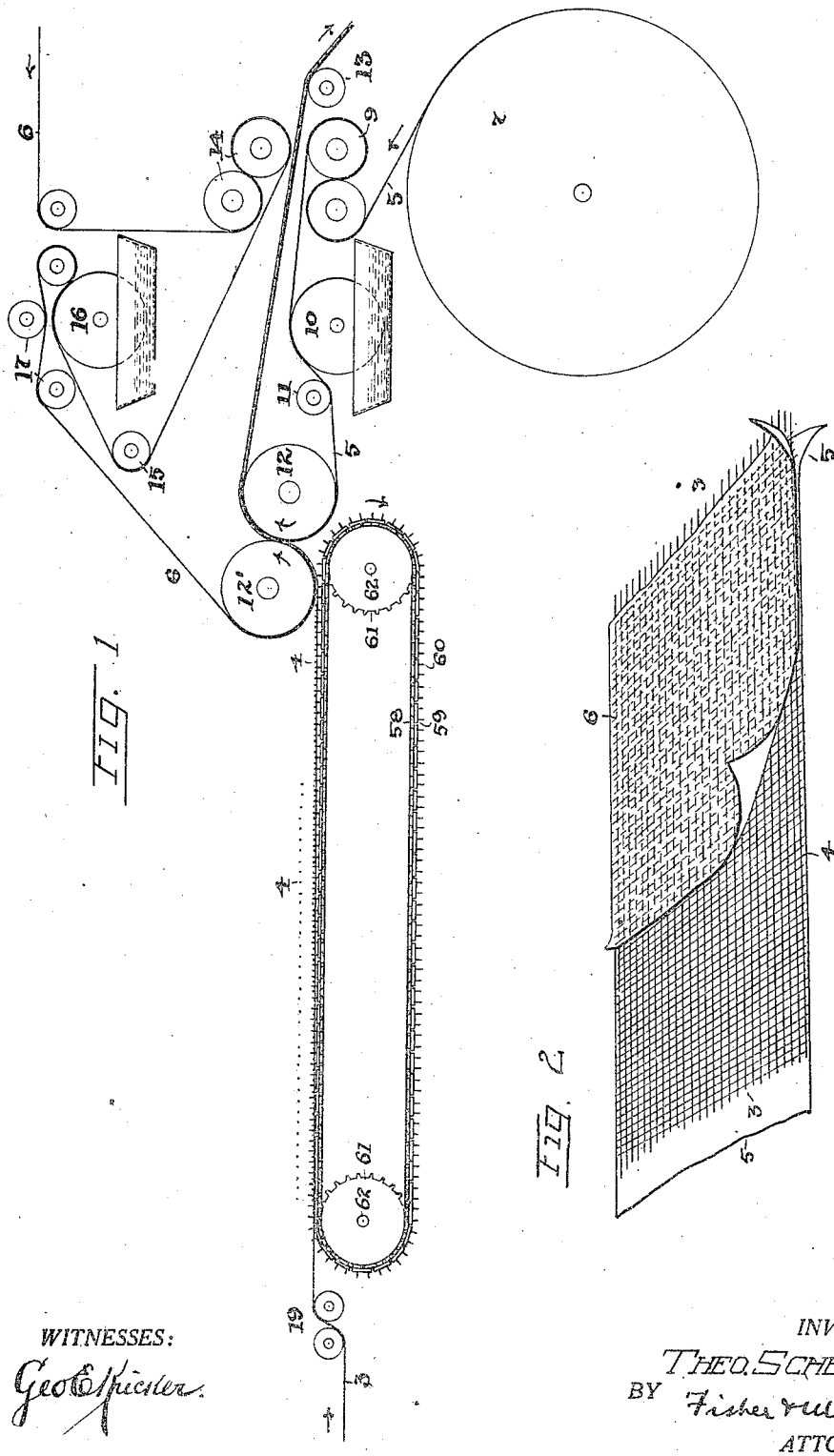

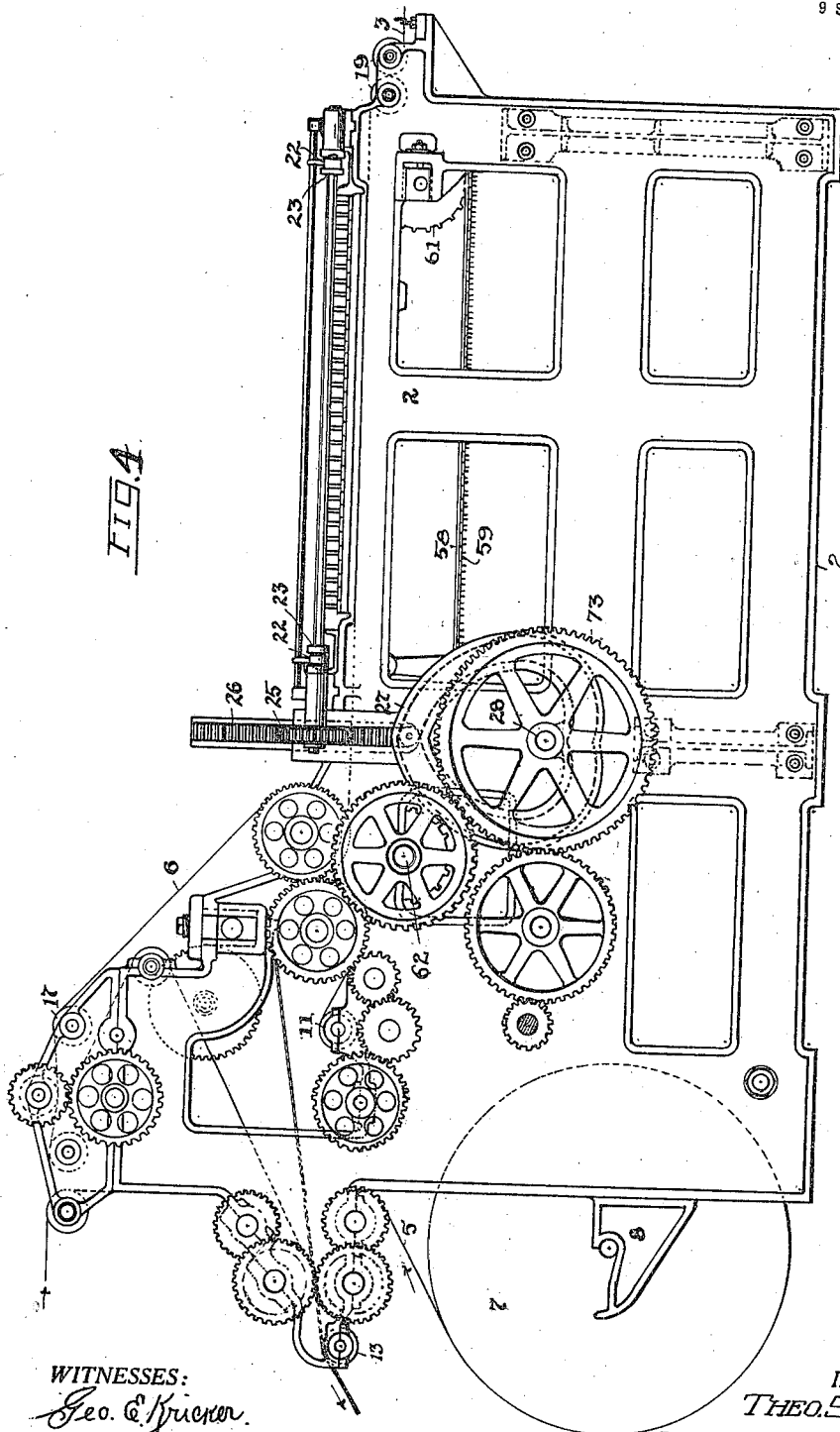

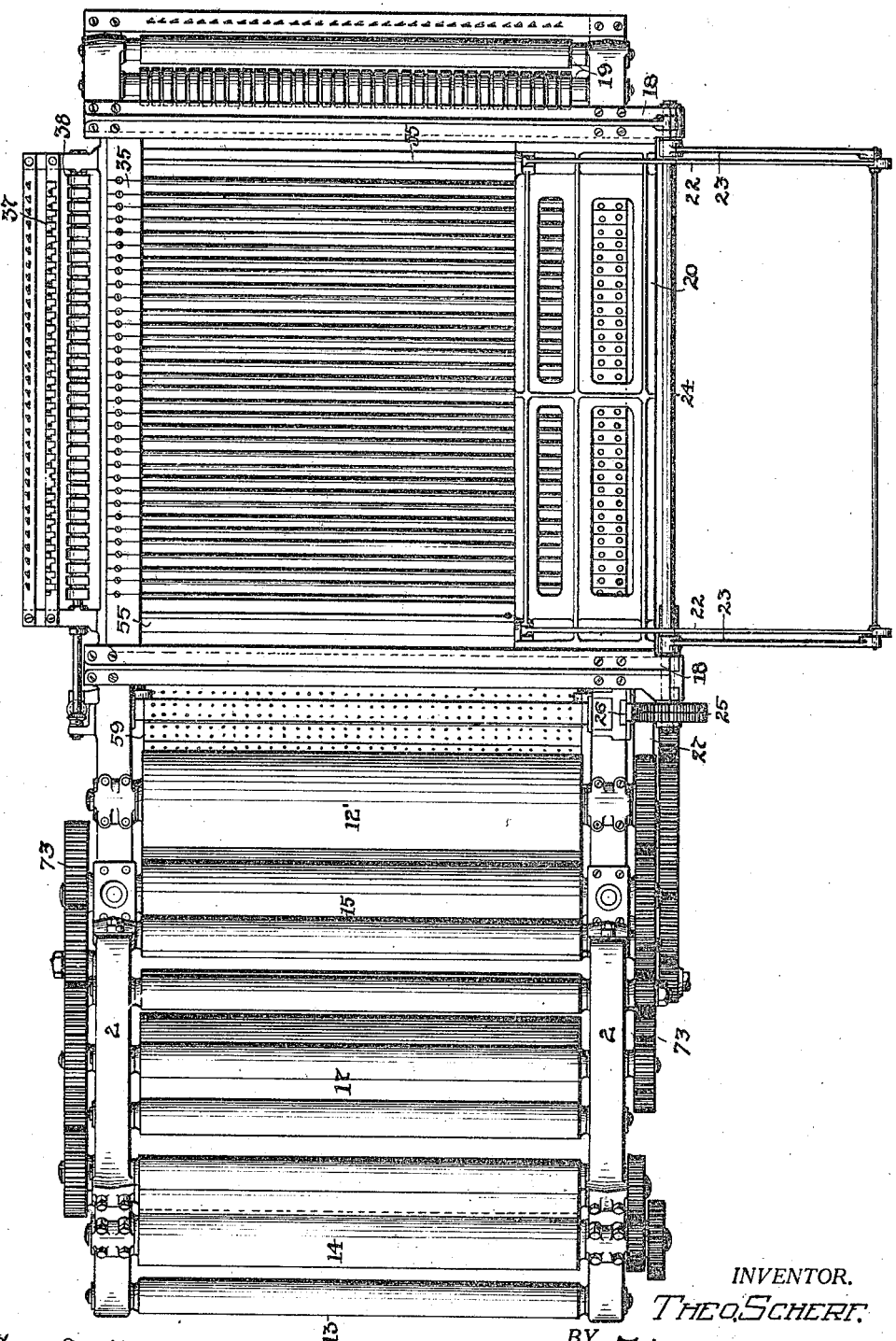

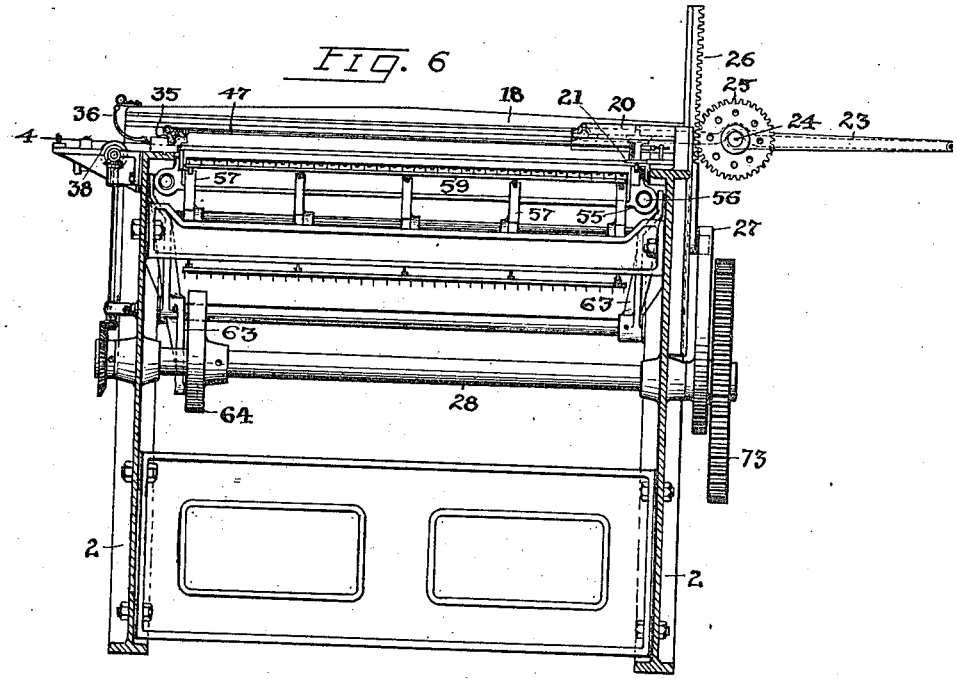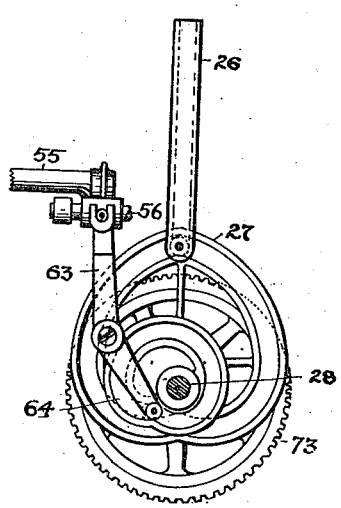

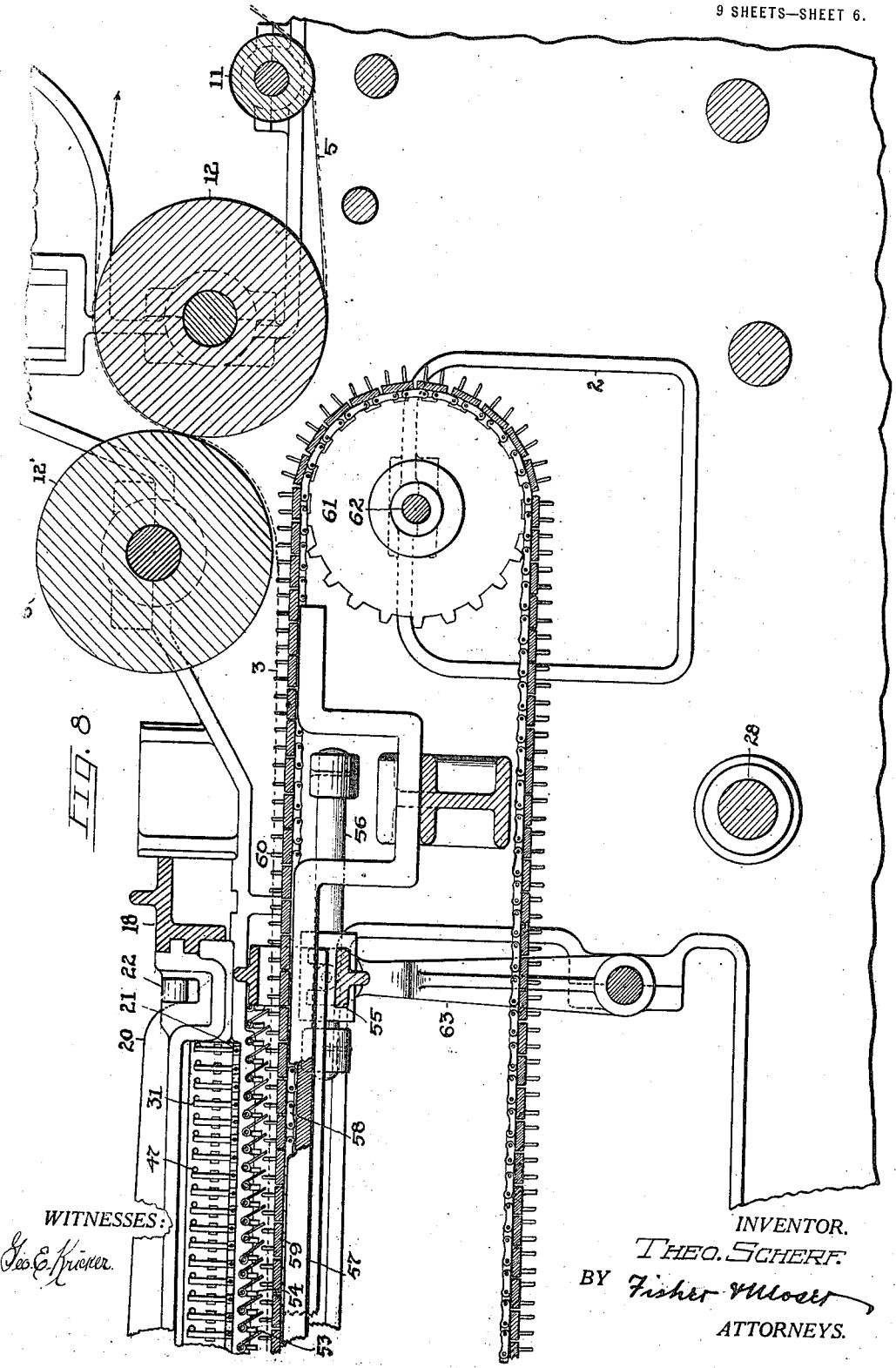

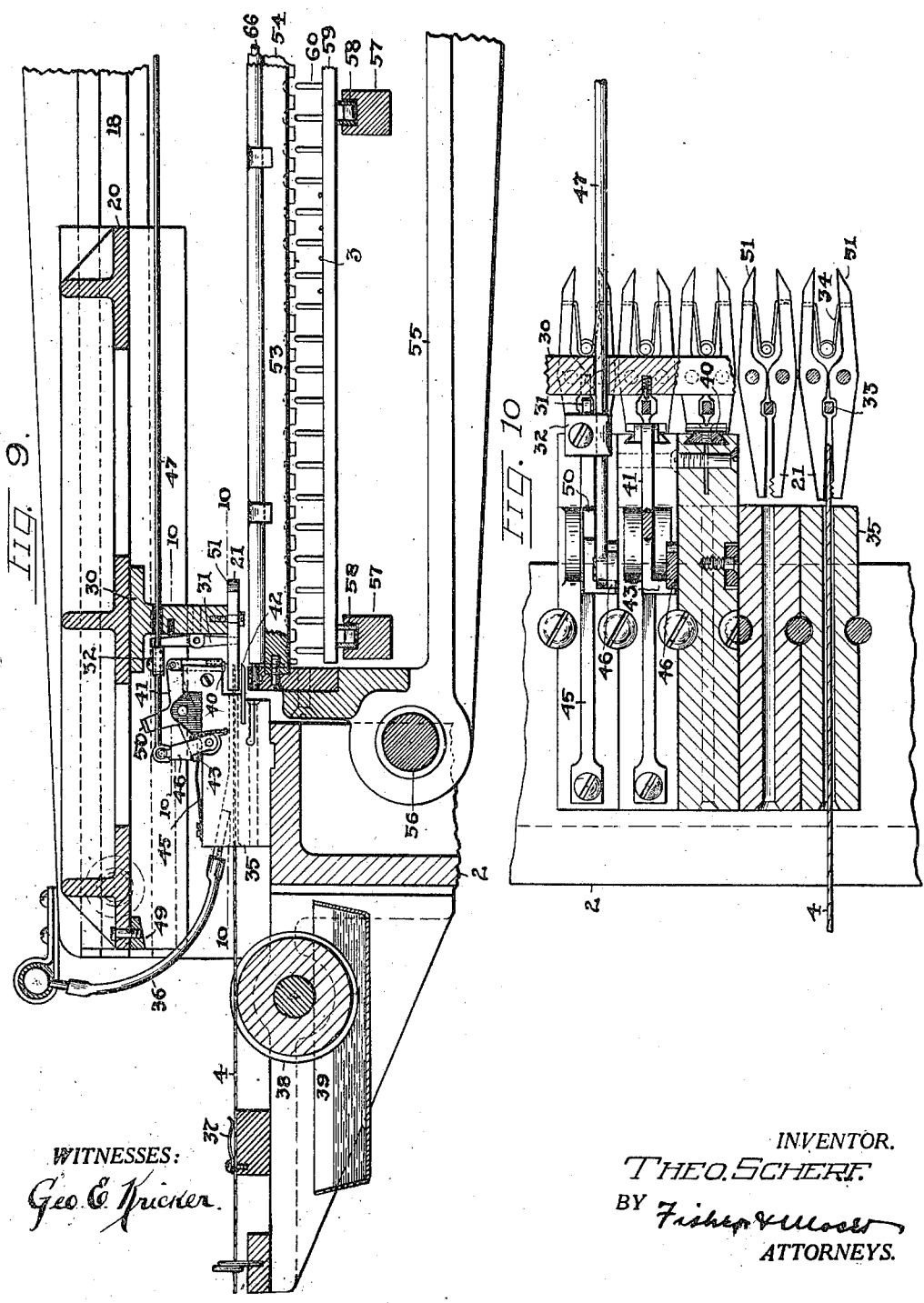

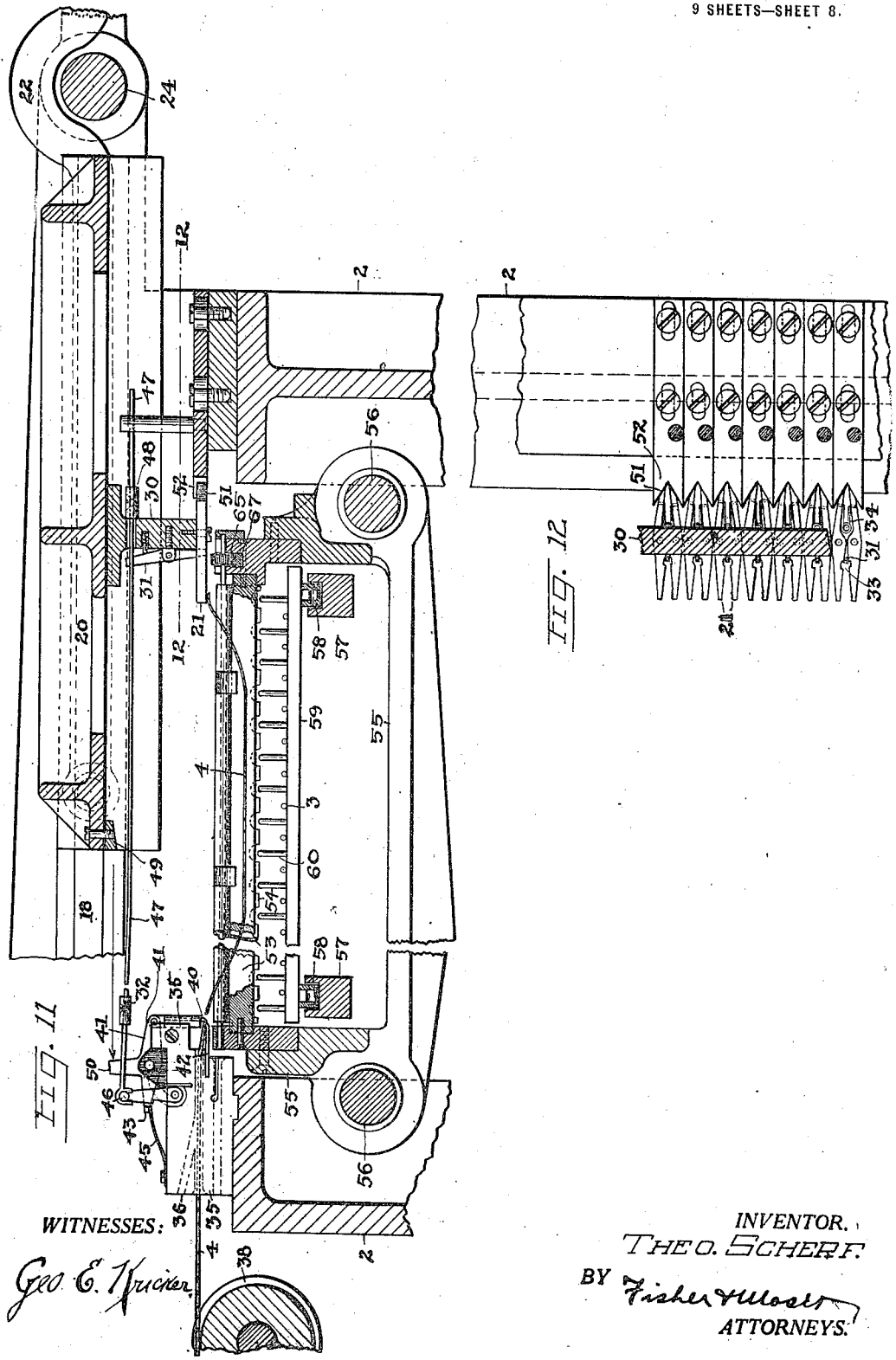

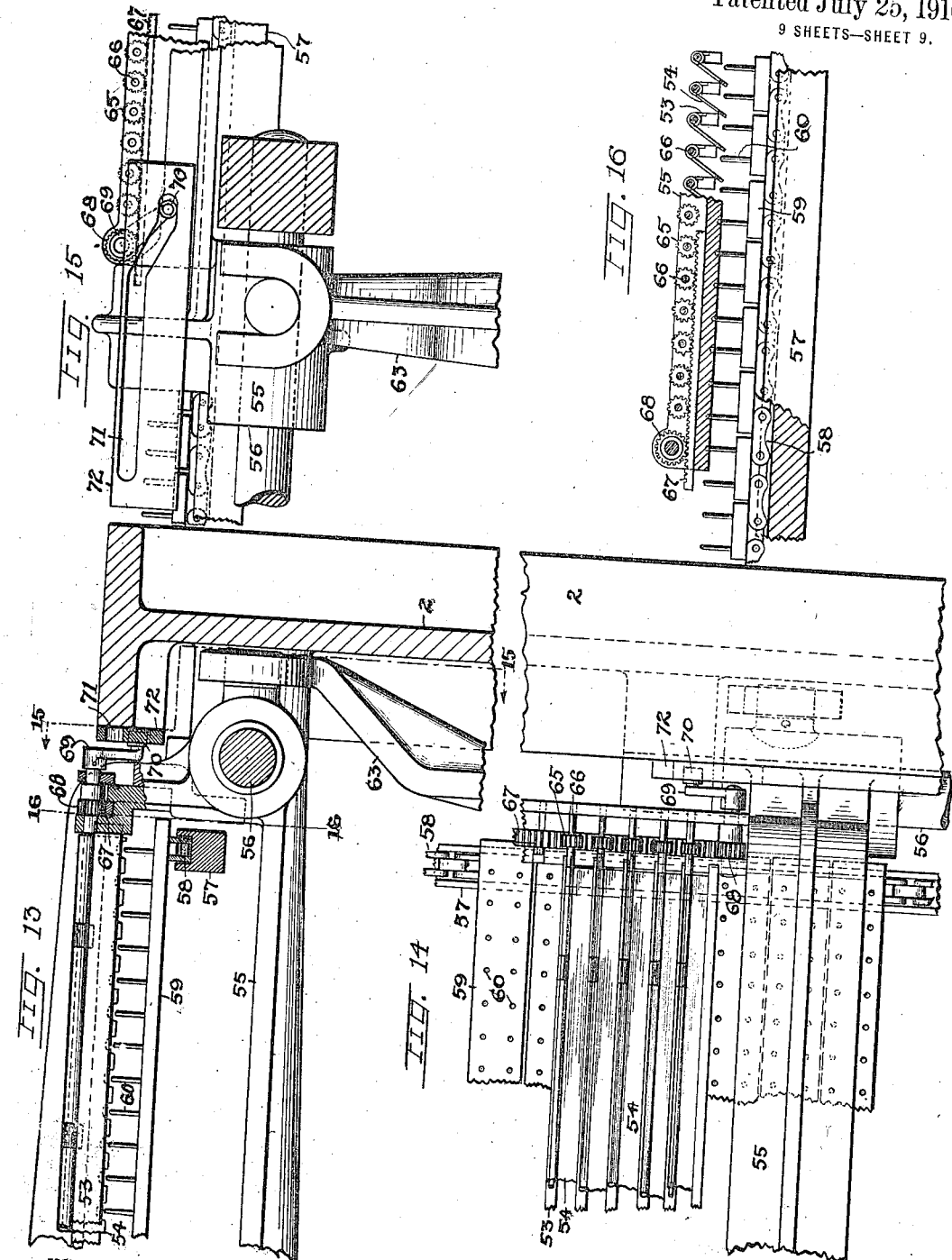

UNITED STATES PATENT OFFICE.

THEODORE SCHERF, OF CLEVELAND, OHIO, ASSIGNOR TO THE CLEVELAND-AKRON BAG COMPANY, OF CLEVELAND, OHIO, A CORPORATION OF OHIO.

MACHINE FOR MAKING REINFORCED PAPER.

1,192,568.  Specification of Letters Patent.  Patented July 25, 1916.

Application filed September 9, 1915. Serial No. 49,684.

*To all whom it may concern:*

Be it known that I, THEODORE SCHERF, citizen of the United States, residing at Cleveland, in the county of Cuyahoga and State of Ohio, have invented certain new and useful Improvements in Machines for Making Reinforced Paper, of which the following is a specification.

This invention relates to a machine for making reinforced paper, and the machine is designed more particularly to produce a double-ply paper having threads of any suitable fibrous substance embedded longitudinally and transversely between the paper layers or plies. As produced, the paper is fed through the machine in the form of strips of any suitable length and width, and the longitudinal threads are fed at the same speed and in the same direction as the paper. This movement is as constant as the supply of paper and thread, and in effect is a continuous feed. The cross threads are fed transversely of the machine and cut into predetermined lengths equal to the width of the paper, and then deposited, first within a transfer device, and second, upon the moving longitudinal threads. A relatively large number of cross threads are deposited on parallel lines at one time and in such timed movement with the longitudinal threads that each group of transverse threads is properly placed at intermittent intervals in consecutive order thereon. Proper spacing of the transverse threads is also maintained until the superimposed threads are introduced between the two plies of paper and permanently united therewith by a paste or adhesive applied to the meeting surface of the two plies of paper. In this way a double-ply reinforced paper of uniform texture and strength is rapidly and cheaply produced, or by omitting one of the plies a single sheet of paper having threads applied to one side may also be produced.

In the accompanying drawings, Figure 1 is a diagrammatic view, showing the irregular lines of travel of the paper and the feed of the longitudinal threads thereto. Fig. 2 is a perspective view of a portion of the product of the machine. Fig. 3 is an elevation of one side of the machine, and Fig. 4 is a similar view of the opposite side. Fig. 5 is a plan view, and Fig. 6 is a transverse section of the machine. Fig. 7 is a detail view of the cams and associated parts for reciprocating the delivery carriage and the transfer-hopper frame. Fig. 8 is a sectional view on a larger scale of the central portion of the machine, showing the mechanism for conveying the thread to the paper and the pressure rollers. Fig. 9 is a transverse section of the upper part of the machine at one side where the cross threads are fed to the grippers and cutting devices, and Fig. 10 is a plan and section view on lines 10—10, Fig. 9. Fig. 11 is a transverse section of the machine corresponding in part to Fig. 9, but showing the feed carriage for the cross threads as moved to the right side of the machine with a cross thread dropping into a transfer hopper above the spacing conveyer. Fig. 12 is a plan view in section on line 12—12, Fig. 11, showing the grippers opened. Fig. 13 is a cross section of a part of the main frame and the hopper frame, showing the rack and gear mechanism for opening and closing the hoppers. Fig. 14 is a plan view of Fig. 13, and Fig. 15 is a side elevation looking inward from line 15—15, Fig. 13. Fig. 16 is a sectional detail on line 16—16, showing the hopper rack and gears, and a section of the spacing conveyer.

The machine comprises a main frame 2 carrying various co-acting mechanism to produce a double-ply paper having interposed threads 3 and 4 laid at right angles in such numbers and spaced relations as any given requirement may dictate. The strips of paper 5 and 6 are fed separately into one and the same end of the machine from suitable rolls 7, one of which is shown in the drawings as removably mounted on a pair of open brackets 8 at one end of the main frame. This paper strip 5 forms the bottom ply of the product and passes from the roll 7 to a pair of feed rollers 9 and thence to a paste-applying roller 10 and under an idler 11 and around one of a pair of pressure rollers 12 before doubling back on a straight line to an idler 13 at the discharge point in the machine. The upper strip of paper 6 passes into the upper part of the machine and downwardly over an idler to a pair of feed rollers 14 and thence upwardly at an inclination to an idler 15 before passing over a paste-applying roller 16 and back through a set of idlers 17 to the pressure roller 12' around which it travels in opposed relations to paper strip 5 to bring the pasted sides of both paper strips together for conjoint travel and discharge to idler 13.

The threads 3 and 4 are delivered to the pasted side of paper strip 6 at a point directly beneath pressure roller 12' and pass between the two strips and both pressure rollers, thereby uniting the threads and the strips in the exact relations as delivered. The threads 3 are fed longitudinally of the machine in parallel lines one half of an inch apart over the full width of the paper, but the number of threads and the spacing thereof may be varied dependent upon the amount of reinforcement desired, and this may also be said of the cross threads 4 which are placed transversely of the paper in uniform spaced relations and superimposed upon the longitudinal threads 3. These longitudinal threads are drawn in a straight line under more or less tension by the pressure rollers from a pair of rollers 19 at the opposite end of the machine, one of said rollers being grooved to space the threads and the speed of travel of the threads being the same as the paper; and the cross threads 4 are delivered to the machine at one side thereof and carried across the longitudinal threads at the top of the machine by a transversely-movable carrier 20 having individual grippers 21 for the ends of the cross threads, see Figs. 9 and 10. Carriage 20 comprises an open frame slidably confined at its ends in channeled-cross pieces 18 of the main frame, and adapted to be reciprocated by means of links 22 engaged with fixed arms 23 on the oscillatory shaft 24 which is operated by a gear 25, a vertical rack 26, and a cam 27 on a cam shaft 28, see Figs. 5 and 6. The grippers 21 comprise spring-pressed fingers pivotally mounted in pairs in close formation at the bottom of a longitudinal bar 30 midway of carriage 20, and a series of spring-pressed levers 31 are employed to hold the jaw ends of each pair of fingers open to receive the ends of the cross-threads 4 during the reciprocal movement of carriage 20 to the left side of the machine. In other words, levers 31 are pivoted at one side of bar 30, and the lower end thereof occupies a nr. .ied or recessed portion 33 in the meeting faces of each pair of fingers and the finger jaws are caused to close upon the thread by their respective springs 34. Each thread 4 is alined opposite a corresponding pair of gripping fingers by perforated guides 35 having an air blast connection 36, the blast of air keeping the projecting thread end straight during the approach of the gripping fingers. The threads 4 are also held under tension by flat springs 37, and engaged with or passed around a series of grooved rollers 38 which are partly immersed in water in a pan 39, see Fig. 9, thereby moistening and straightening the threads as a preliminary step in operations.

Cutting of the cross threads 4 into length corresponding to the width of the paper is an operation which occurs subsequent to the drawing of the threads transversely of the machine by the gripping fingers and carriage 20. The cutters comprise independent blades 40 dove-tailed to slide vertically in the overhanging portions of the guide bodies 35, see Figs. 9 and 10, and each blade 40 is pivotally engaged with one arm of a rock member 41 and co-acts with a horizontal blade 42 located beneath the threads 4. Each rock member 41 has an extension 43 engaged by a spring 45 to produce a cutting movement of the blade 40 upon release of said extension from a pivoted check lever 46 which is connected at its upper end to the hook end of a transverse rod 47 slidably engaged with the bottom of the carriage 20. Thus a pull to the right of rod 47 will effect release of the rock member and permit each blade 40 to descend and sever the threads 4. Such pull is produced at the end of the movement of carriage 20 to the right when the carriage bar 30 engages a contact member 48 adjustably secured upon rod 47, see Fig. 11. A return movement of the carriage 20 to the left will relock the rock member 41 and check lever 46 when the beveled piece 49 upon the bottom of carriage 20 engages and rides over the upright arm 50 of the rock member and tilts it on its pivot, an action immediately followed by the forced movement of check lever 46 to the left by engagement of lever 31 with stop member 32 on rod 47, which lever 31 is fixed on and moves with carriage bar 30, see Fig. 9.

Now reviewing further the movement of carriage 20 to the right, the end of this movement brings the beveled ends 51 of the gripper fingers in contact with the reversely-beveled end edges 52 of a set of plates adjustably secured to the main frame 2, thereby separating the jaw ends of each pair of fingers and releasing the threads 4 concurrently with the severing of the same threads at the opposite side of the machine, see Figs. 11 and 12. After the cross threads 4 are severed and released they drop by gravity into a series of transverse hoppers formed by transverse bars 53 and spring-pressed hinged plates 54 set in inclined relations upon a longitudinally-movable frame 55 which is slidably supported at its ends and sides upon a set of short shafts 56 within the inside of main frame 2. This transfer device for threads 4 spans an endless conveyer consisting of a set of sprocket chains 58 extending longitudinally of the machine and cross strips 59 having a double row of spacing pins 60 thereon to separate both the longitudinal threads 3 and the cross threads 4. The upper stretch of the conveyer is supported upon several guide bars 57 and travels in the same direction as the longitudinal threads 3, the chains 58 being carried and driven by sprocket wheels 61 upon the cross shafts 62, and when the proper time for transferring the cross threads from the hoppers to the conveyer arrives, the slidable frame 55 is caused to travel forwardly at the same speed as the conveyer and during this travel each hinged hopper plate 54 is swung open to deposit the cross threads 4 on the longitudinal threads 3 between the double row of pins on each conveyer strip 59.

The reciprocal movement of the hopper frame is produced by a pair of oscillatory arms 63 operated by a cam 64 on cam shafts 28, see Figs. 6 and 7, and the opening and closing movement of the hopper plates 54 is effected by pinions 65 on the rotatable shaft 66 for each plate and by a reciprocal rack bar 67 having gear teeth in mesh with said pinions and operated by an oscillatory gear 68 and arm 69 having a roller 70 riding in a cam slot or groove 71 in a plate 72 affixed to the inside of main frame 2, see Figs. 13 to 16. In this way, a reciprocal movement of the hopper frame 55 causes an oscillatory movement of arm 69 and gear 68 and reciprocates the rack bar 67, thereby opening the hoppers and depositing the cross threads 4 upon the longitudinal threads and to the conveyer during a forward movement thereof. Uniform spacing of the threads is thus brought about and maintained until the conveyer delivers the cross threads 4 to the pasted side of the upper paper strip 6 at a point beneath pressure roller 12', and each cross thread is pressed against and caused to adhere to the pasted surface by the longitudinal threads 3 which are under tension and also inclined relatively to the conveyer for the express purpose of lifting the cross threads free from the conveyer pins 60 opposite the pressure roller 12'.

The paper feeding rollers and the thread delivering mechanism operate in timed movement, several lines of gearing 73 on opposite sides of the machine being used to convey the power for this purpose. However, the general arrangement and mode of applying power may be modified and other changes made in the machine without materially departing from the invention herein disclosed and as set forth in the following claims.

What I claim is:

1. In a machine for producing reinforced paper, means to produce a conjoint feed of a pasted strip of paper and a series of longitudinal threads, means to feed a series of parallel threads transversely of said longitudinal threads, means to sever said transverse threads into predetermined lengths, transfer devices to hold said severed threads, and a spacing conveyer beneath said transfer devices to deliver said severed threads to said paper strip.

2. In a machine for producing reinforced paper, paper feeding mechanism, means to deliver a series of threads to the paper fed by said mechanism, and means to moisten the threads preliminary to delivery thereof.

3. In a machine for producing reinforced paper, paper feeding mechanism, means to convey a series of threads to the paper fed by said mechanism, means to moisten the threads, and means to deliver the moistened threads in a straight condition to said conveying means.

4. In a machine for producing reinforced paper, thread feeding mechanism, comprising a conveyer, a transversely movable carriage having thread gripping and releasing devices thereon, and transfer hoppers between said conveyer and carriage.

5. In a machine for producing reinforced paper, a set of paper and thread pressure rollers, a thread conveyer co-acting with said rollers, a set of thread transfer hoppers and a supporting frame coacting with said conveyer, a reciprocal carriage having thread grippers to carry the threads lengthwise of the hoppers, severing devices for the threads, means to open and close said grippers, and means to operate said severing devices.

6. In a machine for producing reinforced paper, a thread conveyer, a reciprocal frame having hoppers spanning said conveyer, and means to open and close said hoppers comprising hinged members, a gear rack, gears, an oscillatory arm, and a stationary cam plate engaged by said arm.

7. In a machine for producing reinforced paper, thread feeding mechanism comprising a reciprocal carriage having gripping members for the thread, and an air blast connection to project the thread on a straight line between said gripping members.

8. In a machine for producing reinforced paper, thread feeding mechanism comprising a longitudinally-movable conveyer, a transversely-movable carriage, thread gripping devices on said carriage, cutting devices for said threads, and transverse hoppers between said conveyer and carriage and means adapted to open and close said hoppers to deliver the threads to the conveyer.

9. In a machine for producing reinforced paper, means to produce a continuous feed of a pasted strip of paper, means to deliver a series of parallel threads lengthwise upon the pasted side of said paper, a conveyer extending lengthwise of said threads, and transfer mechanism to deliver a series of parallel threads of the same length concurrently upon said lengthwise threads and to said conveyer.

10. In a machine for producing reinforced paper, means to feed a series of parallel threads longitudinally between a plural number of pasted strips of paper, movable hoppers to deliver a series of parallel threads transversely upon the said longitudinal threads, and a spacing conveyer co-acting with said longitudinal threads having projections separating the threads and adapted to carry the transverse threads successively between said paper strips.

11. In a machine for producing reinforced paper, feeding mechanism and a set of pressure rollers for the paper, means to paste the paper, a spacing conveyer adapted to deliver a series of transverse threads to said rollers, feeding and severing devices for said transverse threads, transfer mechanism to deliver the severed threads to said conveyer, and means on said conveyer to space both the said longitudinal and transverse threads.

12. In a machine for producing reinforced paper, a set of paper and thread pressure rollers, a thread conveyer having means to deliver a series of longitudinal and transverse threads respectively in spaced relation to said rollers, transfer hoppers adapted to open and close to deliver the transverse threads to said conveyer, and reciprocal feed mechanism to deliver said transverse threads to said hoppers comprising a carriage and grippers to carry the said threads lengthwise of said hoppers.

13. In a machine for producing reinforced paper, a longitudinally-movable conveyer, a longitudinally-movable frame having hoppers spanning said conveyer and adapted to open to deliver the threads to the conveyer, and a reciprocal carriage having thread-delivery means thereon surmounting said hoppers.

14. In a machine for producing reinforced paper, a conveyer for threads, hoppers spanning said conveyer and adapted to transfer the threads thereto, and oscillatory devices and gear and rack mechanism to open and close said hoppers.

15. In a machine for producing reinforced paper, means to affix a plural number of paper strips in facial contact, means to feed a series of threads longitudinally between said paper strips, means to deliver a series of threads transversely of said longitudinal threads, means to sever the transverse threads into predetermined lengths, and means to convey said transverse threads with the longitudinal threads to said paper strips, the said means comprising an endless conveyer having spacing projections on its face for both series of threads.

16. In a machine for producing reinforced paper, means to affix a plural number of paper strips in facial contact and a plural number of separate threads longitudinally between said strips, and means to deliver a series of separate transversely disposed threads of the same length upon said longitudinal threads simultaneously and means to convey said transverse threads into the space between said paper strips with said longitudinal threads.

In testimony whereof I affix my signature in presence of witness.

THEODORE SCHERF.

Witness:
Geo. C. Kricker.